Aug. 2, 1960
E. FERNANDEZ
2,947,159
CLUTCHING MECHANISMS FOR WASHING
MACHINES INCLUDING AN AGITATOR
Filed Nov. 18, 1958
2 Sheets-Sheet 1
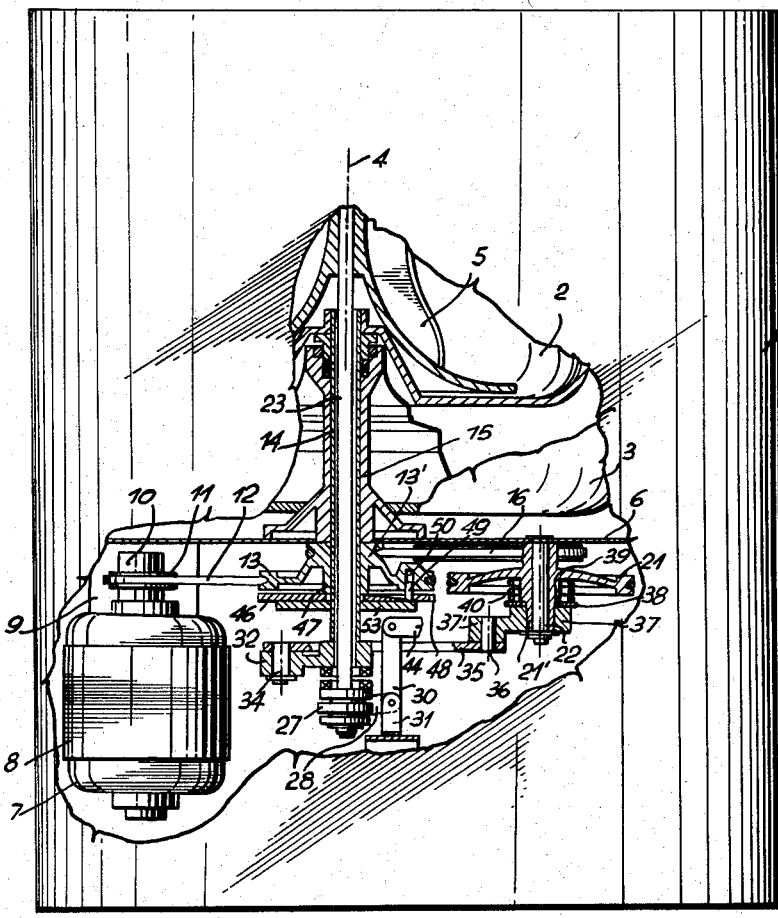
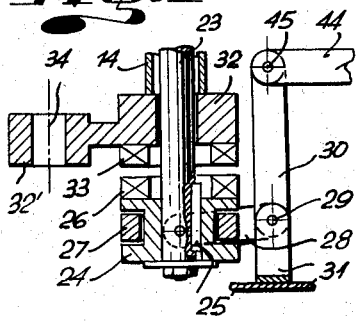
INVENTOR
Enrique Fernandez
BY
Attorney Aug. 2, 1960 E. FERNANDEZ 2,947,159
CLUTCHING MECHANISMS FOR WASHING
MACHINES INCLUDING AN AGITATOR
Filed Nov. 18, 1958 2 Sheets-Sheet 2

INVENTOR
Enrique Fernandez
BY
Attorney

United States Patent Office 2,947,159
Patented Aug. 2, 1960

2,947,159

CLUTCHING MECHANISMS FOR WASHING MACHINES INCLUDING AN AGITATOR

Enrique Fernandez, 1600 Coronel Molinedo, Province of Buenos Aires, Avellaneda, Argentina Filed Nov. 18, 1958, Ser. No. 774,707

2 Claims. (Cl. 68—23)

This invention relates to a washing machine and more particularly it refers to a clutching mechanism for a washing machine of the type comprising a stationary drain tub or water collector in which an upstading spin tub is rotatably housed and wherein in turn an upstanding agitator is rotatably housed, said clutching mechanism being adapted to clutch and declutch respectively said upstanding agitator and said upstanding spin tub from a rotary driving source.

In the field of the above refered to type of washing machines the clutch units so far suggested are all of a very complicated nature having many devices and most of them being mechanically driven and fluid controlled. It happens therefore quite often that these complicated mechanisms fail and require skilled labor to be repaired.

The present invention is a purely mechanical arrangement of simple structure which has the additional advantage that it automatically declutches for instance the spin tub, whilst clutching the agitator at the same time as said spin tub is immobilized or vice versa, that is to say to clutch the spin tub whilst the agitator is declutched.

More particularly, the present invention relates to a washing machine having a stationary drain tub, an upstanding spin tub rotatably housed in said stationary drain tub, an upstanding agitator housed in said spin tub, and a controllable reversible driving source including a driving shaft, a clutching mechanism comprising a hollow shaft integral with said spin tub, a shaft passing through said hollow shaft and rigidly connected to said agitator, a pulley driven by said driving shaft and including a cylindrical projection coaxial with said pulley, a commanding disc loosely mounted on said cylindrical projection, a crank member rigidly mounted on said cylindrical projection, resilient means urging said commanding disc into frictional engagement with said crank member, a crank loosely mounted on said shaft of said agitator, a lever pivotally linking said crank member with said crank for transforming a rotary movement into an oscillatory movement, clutching means slidably mounted on said shaft of said agitator and adapted to clutch said crank for transmitting the oscillatory movement of said crank to said shaft, a lever linkage operatively connected to said clutching means, a projecting arm integral with said commanding disc and connected to said lever linkage, so that when said pulley is rotated in one direction it is adapted to frictionally swing said commanding disc in said direction to operate through said lever linkage said clutching means to clutch said crank, whilst when rotated in opposite direction said clutching means is adapted to declutch said crank.

It is an object of the present invention to provide such a clutching arrangement, which is simply operated by changing the direction of rotation of the electric motor, which is usually the power source.

These and further objects and advantages of the present invention will become more apparent during the course of the following description, wherein a specific embodiment will be described by way of example, in relationship to the accompanying drawings, wherein:

Fig. 1 is a side elevation of a washing machine, partially in longitudinal section, including the clutching mechaism, according to the present invention.

Fig. 4 is a detail in longitudinal section of part of the clutching mechanism when in the position corresponding to that shown in Fig. 2 and which also agrees with the position shown in Fig. 1.

Fig. 5 is a similar longitudinal section as that of Fig. 4, showing the same elements when in the position corresponding to that described in relationship to Fig. 3.

Figure 2:
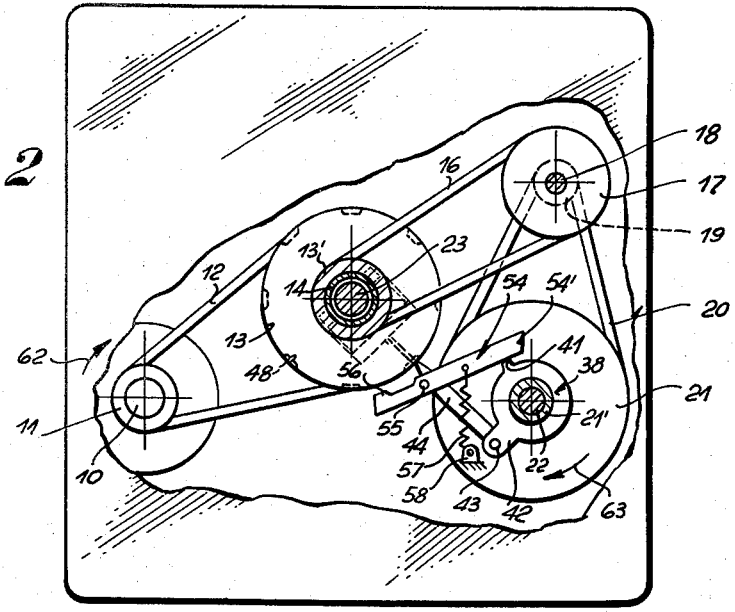
Fig. 2 is a schematic top plan view of the washing machine below the panel 6 with a number of portions not shown in order to clearly illustrate the transmission. This view shows the transmission in the position when the upstanding spin tub (not shown) rotates to carry out the centrifuging step.

As may be seen in Fig. 1 the washing machine comprises an outer casing 1 having on its top the usual door (not shown) for charging the clothes into an upstanding spin tub 2 housed in a stationary drain tub or water collector 3 rigidly mounted in said outer casing 1. The upstanding tub 2, is mounted for rotation about its vertical axis 4. An upstanding agitator 5 is arranged in said tub 2 and provided with means to oscillate about said axis 4, as will be later seen.

A panel 6 is arranged below said drain tub 3 to separate in the outer casing 1 the upper portion from the lower portion wherein the driving unit and clutching mechanism is housed. The driving unit itself consists in this embodiment of an electric reversible motor 7 mounted by means of a clamp 8 on a hanging bracket 9 supported by the panel 6. The electric motor 7 has a vertical driving shaft 10 on which a pulley 11 is mounted and provided with a first belt 12, which drives a double pulley 13 freely mounted on a hollow shaft 14 coaxial with the longitudinal axis 4 and arranged in a stationary bushing 15 supported by the panel 6 and arranged above said panel 6. On the smaller diameter or second pulley 13' of the double pulley 13 a second belt 16 is arranged (see also Fig. 2) which is furthermore mounted on a third pulley 17 arranged on an intermediary shaft 18, which is further provided with a fourth pulley 19 of smaller diameter than said third pulley 17 and which fourth pulley 19 is provided with a third belt 20. Shaft 18 is again supported by the panel 6 (not shown in Fig. 2). The third belt 20 drives a fifth pulley 21 loosely mounted on a transmission shaft 22 (see also Fig. 1).

A solid shaft 23 is rotatably mounted inside the hollow shaft 14, and on the upper end of said solid shaft 23 is keyed the upstanding agitator 5. The solid shaft 23 passes through the double pulley 13 and accessories (to which reference will be made later on) and rigidly supports at its lower end portion, as may be better seen in Fig. 4, a collar member 24, which is keyed onto the shaft 23 by key 25, and which is provided with an upstanding clutching teeth ring 26. A commanding ring 27 integral with a fork member 28 is pivoted by means of pivot 29 to a first lever 30 supported by a stationary fulcrum member 31. It will be appreciated by comparing Figs. 4 and 5 that the collar member 24 is adapted to slide up and down along axis 4 by swinging the first lever 30 about pivot 29.

A crank 32 is freely mounted on the solid shaft 23 above the collar member 24 and is likewise provided with a clutching teeth ring 33 facing the upstanding clutching teeth ring 26. A stub shaft 34 (see Fig. 1) is arranged in a bushing 32' of the crank 32 and is further connected to a lever 35, the other end of which is connected to pivot 36 mounted in the projecting arm 37' of a crank member 37 rigidly connected to the cylindrical projection 21' of the fifth pulley 21. A commanding disc 38 is freely mounted on said cylindrical projection 21' on top of said crank member 37 and bearing against a shoulder 39 of said cylindrical projection 21'. A helical compression spring 40 is arranged between said commanding disc 38 and said fifth pulley 21.

Turning now to Fig. 2, it may be appreciated that said commanding disc 38 provides a cam portion 41 and a radially projecting arm 42, which by means of pivot 43 is linked to a second lever 44, the other end portion of which is bent at 90° and as shown in Figs. 1, 4 and 5 is connected by means of pivot 45 to the first lever 30.

Figure 6:
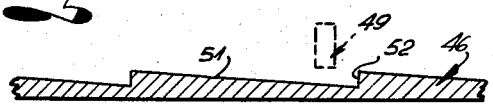
Fig. 6 is a detail in longitudinal section of a development of the free wheel arrangement.

Turning now once more to Fig. 1 below the double pulley 13 a free wheel clutching disc 46 is loosely mounted on the lower free end of the hub 47 and is further provided on its periphery with a plurality of radially spaced apart recesses 48 (see also Fig. 2). The free wheel arrangement may be of any known type of for instance that shown in Fig. 6. More particularly, the double pulley 13 is provided with a plurality of spaced apart pins 49 (only one visible) which are housed in corresponding housings 50 and due to gravity tend to fall downwardly onto the sloped surfaces 51 of the free wheel clutching disc 46. It will be understood by those skilled in the art, that when the double pulley 13 turns in one direction the pins 49 will butt against the upstanding surfaces 52 and thereby drag along the free wheel clutching disc 46, whilst when rotating in opposite direction the disc 46 remains stationary. A friction disc 53 is rigidly connected to the hollow shaft 14 and in frictional engagement with the free wheel clutching disc 46.

Reverting now again to Fig. 2, it may be appreciated that the blocking lever 54 is mounted on a pivot 55 and has a projecting blocking tooth 56 adapted to enter into any of the recesses 48 and a cam operated end portion 54' in operative relationship with the cam portion 41 of the commanding disc 38. A spring 57 is connected to said blocking lever 54 between said pivot 55 and said cam operated end portion 54' and is further connected to a stationary bracket 58, so that said spring 57 tends to rotate said blocking lever 54 in clockwise direction about pivot 55.

Figure 3:
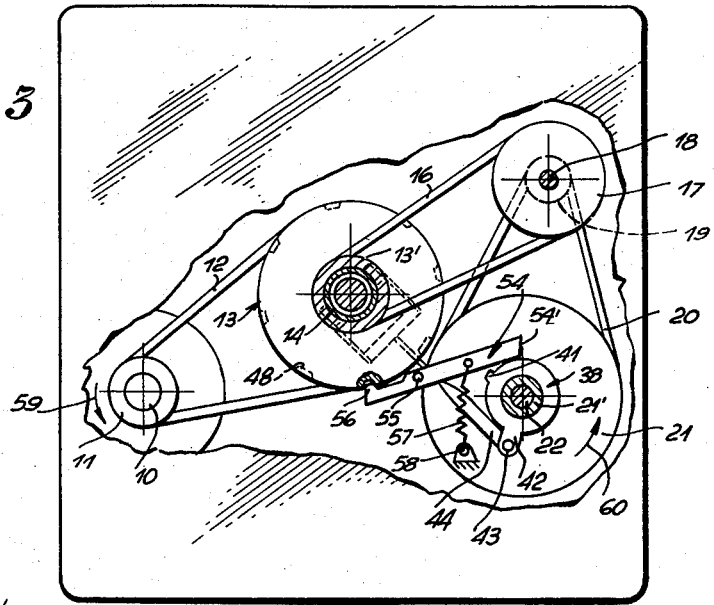
Fig. 3 is a similar cross section as Fig. 2, showing the same mechanism in the position corresponding to the oscillatory movement about the substantially vertical axis of the agitator (not shown).

As to the operation of the clutching mechanism of the washing machine according to the present invention, assuming that in first instance the upstanding spin tub 2 has already been charged with clothes and soapy water and that a washing step is to be performed, the vertical driving shaft 10 is rotated in the direction indicated by arrow 59 (see Fig. 3), it will be appreciated that the fifth pulley 21 will be rotated in the direction indicated by arrow 60, that is to say in counter clockwise direction, whereby the helical compressing spring 40 (see Fig. 1) will transmit this movement by friction to the commanding disc 38, which will likewise rotate in the direction indicated by arrow 60 and the cam portion 41 will be withdrawn from the cam operated end portion 54' (compare Figs. 2 and 3) so that as shown in Fig. 3, the spring 57 will urge the blocking lever 54 in clockwise direction whereby the projection block tooth 56 will enter one recess 48 of the free wheel clutching disc 46, so that said disc will not rotate in spite of the fact that the pins 49 (see Fig. 1) will slide over said disc 46 due to the rotatory movement of the double pulley 13 and thus no movement is transmitted to friction disc 53, which remains stationary and with it likewise the upstanding spin tub 2.

Simultaneously, the counterclockwise rotation that is to say in the direction of arrow 60 of the commanding disc 38 will produce a backward movement of the second lever 44 due to the radially projecting arm 42, so that said second lever 44 will move in the direction indicated by arrow 61 to adopt the position shown in Fig. 5, whereby the fork member 28 will raise the collar member 24, thereby clutching the clutching rings 26 and 33. Thus the rotatory movement which is transmitted by the fifth pulley 21 (see Fig. 1) to the crank member 37 is converted in an oscillatory movement through the lever 35 to the crank 32 and through the clutch rings 33, 26 to the collar member 24 and solid shaft 23, whereby the upstanding agitator 5 carries out its oscillatory movement about the vertical axis 4.

To perform the centrifuging step all that is necessary is to change the direction of rotation of the vertical driving shaft 10; more particularly said shaft 10 has to rotate in the direction indicated by arrow 62 in Fig. 2, whereby the fifth pulley 21 will rotate in the direction indicated by arrow 63, so that said movement is transmitted by friction to the commanding disc 38 and the cam portion 41 will act on the cam operated end portion 54', whereby the projecting block tooth 56 is withdrawn from its recess 48, whereby the free wheel clutching disc 46 is free to operate. At the same time the radially projecting arm 42 of the commanding disc 48 pushes the second lever 44 forward in the direction shown by arrow 64 in Fig. 4, thus withdrawing the upstanding clutching teeth ring 26 from the clutching teeth ring 33.

Simultaneously the pins 49 will abut against the upstanding surfaces 52, thereby dragging along the free wheel clutching disc 46, which by friction will gradually transmit the full speed to the friction disc 53 which through hollow shaft 14 will rotate the upstanding spin tub 2 in which the clothes are housed and said upstanding agitator 5 is free to rotate therewith in as much as the clothes will act as a functional linkage between the upstanding spin tub 2 and the upstanding agitator 5.

Due to the arrangement of the frictional coupling during the centrifuging step of the free wheel clutching disc 46 with the friction disc 53, the upstanding spin tub 2 gradually increases its speed until reaching the speed of disc 46, so that harmful vibrations are avoided.

I claim:
1. In a washing machine, a stationary drain tub, an upstanding spin tub rotatably housed in said stationary drain tub, an upstanding agitator housed in said spin tub, a controllable reversible driving source including a driving shaft, a driving pulley mounted on said driving shaft, a clutching mechanism comprising a hollow shaft integral with said spin tub, a shaft passing through said hollow shaft and rigidly connected to said agitator, a double pulley mounted on said hollow shaft, said double pulley comprising a first pulley and a second pulley, a first belt connecting said driving pulley with said first pulley, an intermediary shaft, a third pulley and a fourth pulley mounted on said intermediary shaft, a second belt connecting said second pulley to said third pulley, a transmission shaft, a fifth pulley having a coaxial cylindrical projection and mounted on said transmission shaft, a third belt connecting said fourth pulley to said fifth pulley, a commanding disc loosely mounted on said cylindrical projection, a cam portion and a projecting arm intgeral with said commanding disc, a crank member rigidly mounted on said cylindrical projection, resilient means urging said commanding disc into frictional engagement with said crank member, a crank loosely mounted on said shaft of said agitator, a lever pivotally linking said crank member with said crank for transforming a rotary movement into an oscillatory movement, clutching means consisting of a collar member slidably mounted on said shaft of said agitator, a fork member for upward and downward sliding said collar member, a lever linkage connecting said fork member with said projecting arm, an upstanding clutching teeth ring integral with said collar member, a clutching teeth ring integral with said crank and facing said upstanding clutching teeth ring, said upstanding clutching teeth ring being adapted to clutch said clutching teeth ring by upward sliding movement of said fork member, said lever linkage being capable of raising said collar member when said fifth pulley is rotated in one direction by frictionally swinging said commanding disc in a direction to correspondingly operate said lever linkage, whilst when rotating in opposite direction to carry out the declutching by downward movement of said upstanding clutching teeth ring, a free wheel clutching disc loosely mounted on said hollow shaft below said double pulley, a friction disc rigidly mounted on said hollow shaft and in frictional engagement with said free wheel clutching disc, pin means housed in said double pulley for clutching said free wheel clutching disc when said double pulley rotates in opposite direction to said one direction, said free wheel clutching disc being provided with at least one recess on its periphery, a pivot, a blocking lever pivotally supported by said pivot and including a cam operated end portion at one side of said pivot and a projecting block tooth at the other side of said pivot, resilient means urging said cam operated end portion into frictional contact with said commanding disc and said projecting blocking tooth into engagement with said recess, said cam portion of said commanding disc being adapted to withdraw said projecting block tooth from said recess when said fifth pulley rotates in the direction opposite to said one direction.

2. In a washing machine, a clutching mechanism as claimed in claim 1, wherein said driving source is a reversible electric motor.

References Cited in the file of this patent

UNITED STATES PATENTS

| | | |
|---|---|---|
| 2,512,847 | Conterman | June 27, 1950 |
| 2,639,618 | McNairy | May 26, 1953 |
| 2,647,387 | Lund | Aug. 4, 1953 |
| 2,775,883 | Burris | Jan. 1, 1957 |
| 2,826,056 | Bruckman | Mar. 11, 1958 |

FOREIGN PATENTS

| | | |
|---|---|---|
| 1,019,480 | France | Oct. 29, 1952 |